(12) United States Patent
Cabeca et al.

(10) Patent No.: US 7,492,766 B2
(45) Date of Patent: Feb. 17, 2009

(54) DYNAMIC BUILDING OF VLAN INTERFACES BASED ON SUBSCRIBER INFORMATION STRINGS

(75) Inventors: Linda M. Cabeca, Waltham, MA (US); Mathias Kokot, West Medford, MA (US); Jerome P. Moisand, Arlington, MA (US); Vitali Vinokour, Arlington, MA (US); Thomas Lemaire, Acton, MA (US); Karen Ruben, Lexington, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 479 days.

(21) Appl. No.: 11/402,145

(22) Filed: Apr. 11, 2006

(65) Prior Publication Data

US 2007/0195780 A1   Aug. 23, 2007

Related U.S. Application Data

(60) Provisional application No. 60/775,740, filed on Feb. 22, 2006.

(51) Int. Cl.
*H04L 12/28* (2006.01)
*H04L 12/56* (2006.01)
(52) U.S. Cl. .................. 370/389; 370/409; 709/245
(58) Field of Classification Search .............. None
See application file for complete search history.

(56) References Cited

U.S. PATENT DOCUMENTS 5,903,754 A    5/1999    Pearson

| | | |
|---|---|---|
| 6,131,163 A | 10/2000 | Wiegel |
| 6,195,355 B1 | 2/2001 | Demizu |
| 6,496,479 B1 | 12/2002 | Shionozaki |
| 6,862,274 B1 | 3/2005 | Tsao et al. |
| 6,990,107 B1 | 1/2006 | Rinne et al. |
| 7,298,705 B2 * | 11/2007 | Shankar et al. ............ 370/249 |

(Continued)

FOREIGN PATENT DOCUMENTS

WO    WO 03/067824    8/2003

OTHER PUBLICATIONS

European Search Report dated Mar. 12, 2007, for corresponding European Application No. 06115242.7-2416, 8 pgs.

(Continued)

*Primary Examiner*—Wing F Chan
*Assistant Examiner*—Robert C Scheibel
(74) *Attorney, Agent, or Firm*—Shumaker & Sieffert, P.A.

(57) ABSTRACT

Techniques are described that allow a network device, such as a router, to dynamically build VLAN interfaces based on subscriber information strings included within packets. In particular, the network device comprises an interface controller and a forwarding controller, where the forwarding controller receives the packet over an Ethernet port and forwards the received packet to the interface controller. The packet includes both Ethernet tagging information and a subscriber information string. The interface controller comprises an Ethernet module that dynamically builds a primary virtual local area network (VLAN) sub-interface (PVS) based on the Ethernet tagging information. The Ethernet module also dynamically builds a subscriber VLAN sub-interface (SVS) based on the subscriber information string. The SVS allows the network device to distinguish between subscribers residing on the same VLAN, and, therefore, to provide subscriber specific services.

20 Claims, 7 Drawing Sheets

U.S. PATENT DOCUMENTS

| | | | |
|---|---|---|---|
| 2002/0027906 A1* | 3/2002 | Athreya et al. | 370/386 |
| 2003/0009548 A1 | 1/2003 | Poynor | |
| 2004/0062204 A1* | 4/2004 | Bearden et al. | 370/250 |
| 2004/0088389 A1* | 5/2004 | Shah | 709/221 |
| 2005/0232228 A1* | 10/2005 | Dharanikota et al. | 370/351 |
| 2005/0265397 A1 | 12/2005 | Chapman et al. | |
| 2006/0274774 A1* | 12/2006 | Srinivasan et al. | 370/420 |
| 2007/0047549 A1 | 3/2007 | Park | |
| 2007/0097972 A1* | 5/2007 | Jain et al. | 370/392 |

OTHER PUBLICATIONS

U.S. Appl. No. 11/331,584, entitled "Dynamic Virtual Local Area Network (VLAN) Interface Configuration," filed Jan. 13, 2006.

U.S. Appl. No. 11/031,857, entitled "Dynamic Interface Configuration for Supporting Multiple Versions of a Communication Protocol," filed Jan. 7, 2005.

* cited by examiner

DYNAMIC BUILDING OF VLAN INTERFACES BASED ON SUBSCRIBER INFORMATION STRINGS

This application claims the benefit of U.S. Provisional Application Ser. No. 60/775,740, filed Feb. 22, 2006, the entire content of which is incorporated herein by reference.

TECHNICAL FIELD

The invention relates to computer networks, and more particularly to interface configuration of network devices.

BACKGROUND

Customer networks are networks established by individuals or companies for internal communication. Customer networks may include local area networks (LAN) or wide area networks (WAN) that comprise a plurality of subscriber devices, such as personal computers, laptops, workstations, personal digital assistants (PDAs), wireless devices, network-ready appliances, file servers, print servers, or other devices. The customer networks may meet customer-specific needs using a number of different communication protocols, such as Asynchronous Transfer Mode (ATM) protocol, Ethernet protocol, Bridged Ethernet protocol, frame relay protocols, or other communication protocols. ATM and frame relay protocols, for example, are frequently used for transport of audio, video, and computer data between source and destination devices within a customer network. Such protocols may transfer information in fixed-length units, such as frames.

In order to allow remote customer networks to communicate, Internet Protocol (IP) based communication techniques are being developed that relay frames through an IP-based network, such as the Internet. According to the techniques, a network service provider of the IP network can receive frames from one of the customer networks, encapsulate the frames within packets, and route the packets through the IP network to another customer network.

Service provider networks include network devices, such as routers, that provide subscriber devices of the customer networks with access to the Internet or another network. For example, multiple subscriber devices may connect to a network switch, e.g., a digital subscriber line access multiplexer (DSLAM), maintained by the service provider network. Although data for the multiple subscriber devices connected to the network switch are transported over the same physical connection, each of the subscriber devices typically has a dedicated subscriber interface, e.g., an ATM virtual circuit (VC) or an Ethernet virtual local area network (VLAN), to the network device and hence the Internet.

VLANs are a generic grouping mechanism for Ethernet packets independent of media access control (MAC) addressing. VLANs enable the network switch to multiplex multiple protocol interfaces over a single physical Ethernet port. For example, the network switch may present both IP interfaces and Point-to-Point Protocol over Ethernet (PPPoE) interfaces on one or more VLANs. Typically, an Ethernet frame header includes a VLAN identification (VID) tag that identifies the VLAN associated with the Ethernet packet. The VLAN may comprise either a single tagged VLAN or a double tagged VLAN. A single tagged VID identifies the subscriber device that sent the packet to the network device. A double tagged VID identifies both the subscriber device that sent the packet and the network switch that transferred the packet from the subscriber device to the network device. Use of VIDs allows applications, such as a Broadband Remote Access Server (BRAS) application, to identify specific subscriber devices, thereby allowing these types of applications to provide subscriber specific services.

Currently, service provider networks are migrating away from ATM to Ethernet based infrastructures; however, many of these service providers are either functionally unable or refuse to include VIDs in Ethernet frame headers. Without VIDs, applications, such as a BRAS application, may no longer easily distinguish between multiple subscriber devices, which may significantly the limit ability to deliver subscriber specific services.

SUMMARY

In general, the invention is directed to techniques for dynamically building an Ethernet virtual local area network (VLAN) interface within a network device based on a subscriber information string included within a packet. For example, the techniques allow dynamic building of a primary VLAN sub-interface (PVS) and a subscriber VLAN sub-interface (SVS) over a statically built VLAN major interface. A network device, such as a router, may employ the techniques to identify a subscriber device associated with the packet that may not include a VLAN identification (VID) in order to dynamically build both the PVS and SVS for the identified subscriber. In this way, the network device may provide subscriber specific services by recognizing packets received from specific subscriber devices even when the packets are received without VIDs.

The network device comprises an interface controller and a forwarding controller that includes an Ethernet port that receives packets. Upon receiving a protocol signaling packet, such as a Dynamic Host Configuration Protocol (DHCP) discovery packet, a Point-to-Point Protocol over Ethernet (PPPoE) Active Discover Initiation (PADI) packet, or a PPPoE Active Discover Request (PADR) packet on the Ethernet port, the network device determines whether a PVS exists to handle the protocol signaling packet. If no PVS exists, the forwarding controller exceptions the packet to an Ethernet module, which dynamically builds a PVS over the VLAN major interface to handle the protocol signaling packet based on Ethernet tagging information included within the protocol signaling packet.

If a PVS exists, the network device uses a VLAN subscriber manager (VSM) to determine whether a SVS exists to handle a subscriber information string included in the protocol signaling packet. If an SVS does not exist, the VSM issues a request that the Ethernet module dynamically build an SVS over the VLAN major interface based on the subscriber information string. If a SVS exists, the VSM returns the SVS to handle the packet and the forwarding controller forwards the packet over the SVS.

In one embodiment, a method comprises receiving a packet on an Ethernet port of a network device, wherein the packet includes Ethernet tagging information and a subscriber information string. The method further comprises dynamically building within the network device a PVS based on the Ethernet tagging information, and dynamically building within the network device a SVS based on the subscriber identification string.

In a further embodiment, a network device comprises an interface element that includes an interface controller and an Ethernet port, and a forwarding controller that receives a packet from the Ethernet port and forwards the received packet to the interface controller, wherein the packet includes Ethernet tagging information and a subscriber information string. The network device further comprises an Ethernet module in the interface controller that dynamically builds within the network device a PVS based on the Ethernet tagging information, and a SVS based on the subscriber information string.

In another embodiment, a computer-readable medium comprises instructions that cause a programmable processor to receive a packet on an Ethernet port of a network device, wherein the packet includes Ethernet tagging information and a subscriber information string. The computer-readable medium further comprises instructions to cause the programmable processor to dynamically build within the network device a PVS based on the Ethernet tagging information, and dynamically build within the network device a SVS based on the subscriber identification string.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
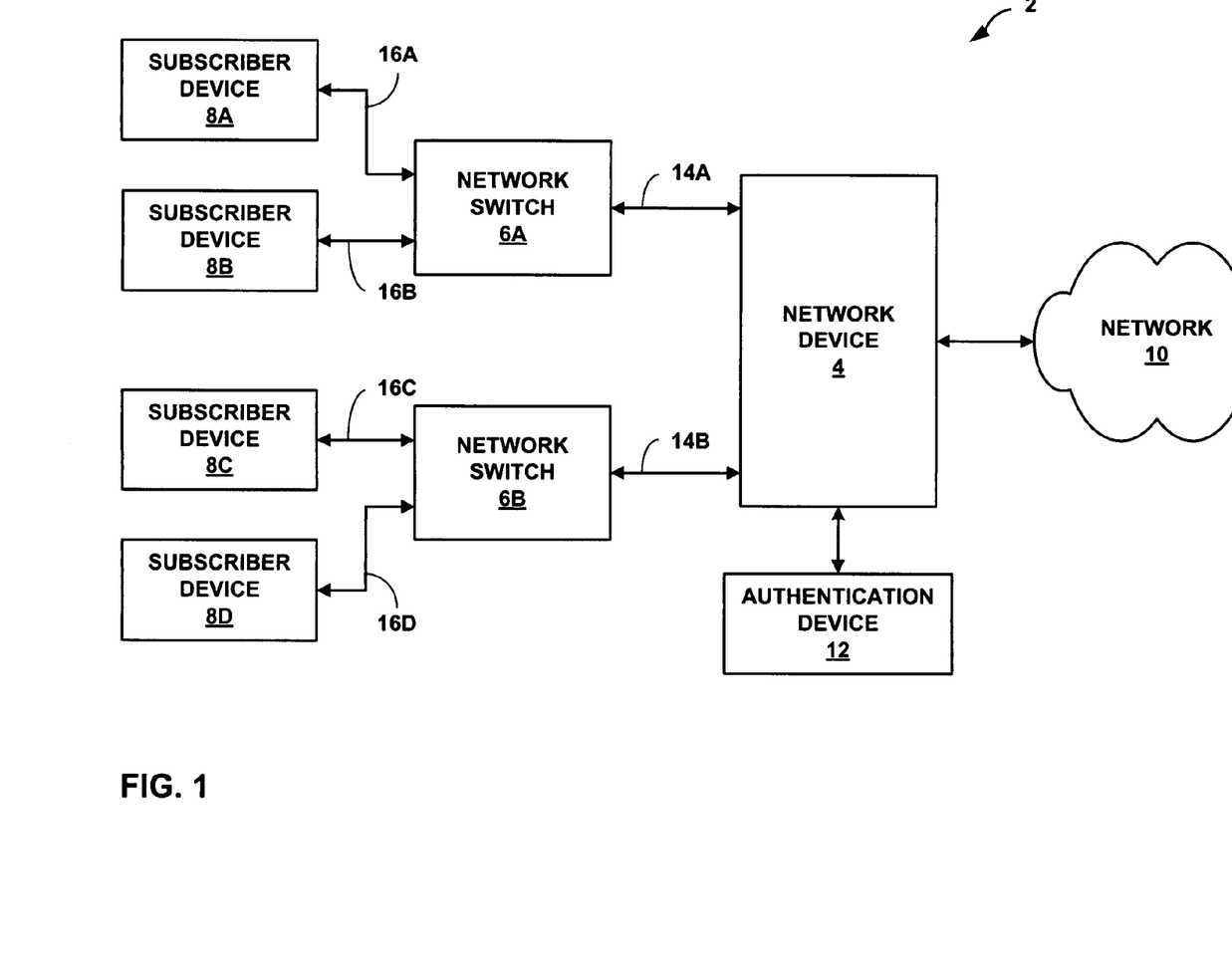
FIG. 1 is a block diagram illustrating an exemplary system in which a network device provides subscriber devices with connectivity to a network.

FIG. 1 is a block diagram illustrating an exemplary system 2 in which a network device 4 provides subscriber devices 8A-8D ("subscriber devices 8") with connectivity to a network 10. System 2 comprises an Ethernet infrastructure; however, in other embodiments, system 2 may comprise another layer 2 protocol infrastructure, such as an Asynchronous Transfer Mode (ATM) infrastructure. Subscriber devices 8 connect to network device 4 via network switches 6A and 6B ("network switches 6"). Network switches 6 transfer Ethernet packets received from subscriber device 8 to network device 4 over Ethernet virtual local area networks (VLANs).

The invention described herein provides techniques for dynamically building an Ethernet VLAN interface within network device 4 based on subscriber information strings included within a plurality of packets, as opposed to conventional techniques which require VLAN identification (VID) to dynamically build an Ethernet VLAN interface for a specific one of subscriber devices 8. In some cases, the subscriber information strings may be referred to as agent circuit identifiers (ACIs). The techniques described herein allow network device 4 to dynamically build an Ethernet VLAN interface based on subscriber information strings included in a plurality of protocol signaling packets, such as Dynamic Host Configuration Protocol (DHCP) discovery packets and Point-to-Point Protocol over Ethernet (PPPoE) PPPoE Active Discover Initiation (PADI) and PPPoE Active Discover Request (PADR) packets. Dynamically building the Ethernet VLAN interface based on subscriber information strings allows network device 4 to differentiate between subscriber devices 8 even though the plurality of packets may not include VIDs. In differentiating between subscriber devices 8, network device 4 may continue to provide subscriber specific services to subscriber devices 8.

In general, the term "interface" is used herein to refer to a software interface that is created or otherwise instantiated within a network device to support network communications. The term "interface stack" refers to a layered representation of multiple software interfaces that may be viewed as a stack or a column of interfaces. Network data propagates up or down the interfaces of the interface stack, and each interface typically corresponds with a different network communication protocol or format. In general, the software interfaces of the interface stack created by the network device correspond with one or more layers of the seven layer Open System Interconnection (OSI) networking model.

Network 10 represents any computer network and may have a variety of networked resources capable of data communication. For example, network 10 may include routers, hubs, gateways, servers, workstations, network printers and faxes or other devices. Network 10 may comprise an Internet Protocol (IP) network that includes both an IP version four (IPv4) portion and an IP version six (IPv6) portion. Moreover, network 10 may represent the Internet or any public or private network.

Subscriber devices 8 may comprise personal computers, laptops, workstations, personal digital assistants (PDAs), wireless devices, network-ready appliances, file servers, print servers or other devices. In some cases, subscriber devices 8 may be included within one or more customer networks. For example, subscriber devices 8A and 8B may be included in one customer network and subscriber devices 8C and 8D may be included in another customer network. Customer networks represent networks established by individuals or companies for internal communication and may include local area networks (LANs) or wide area networks (WANs) that comprise a plurality of subscriber devices. In some embodiments, customer networks may be customer-specific networks that use the Ethernet protocols or another layer 2 protocol to communicate information in fixed or variable-sized units referred to as frames.

In the illustrated example, subscriber devices 8A and 8B connect to network device 4 via network switch 6A, and subscriber devices 8C and 8D connect to network device 4 via network switch 6B. In other embodiments, any number of network switches 6 may connect to network device 4 and any number of subscriber devices 8 may connect to each of the network switches. In one embodiment, network switches 6 may comprise digital subscriber line access multiplexers (DSLAMs) or other switch devices. Each of subscriber devices 8 may utilize a Point-to-Point Protocol (PPP) 16A-16D ("PPP 16"), such as PPPoE, to communicate with network switches 6. For example, using PPP 16, one of subscriber devices 8 may request access to network 10 and provide login information, such as a username and password. PPP 16 may be supported on digital subscriber lines (DSLs) that connect subscriber devices 8 with network switches 6. In other embodiments, subscriber devices 8 may utilize a non-PPP protocol to communicate with network switches 6.

Each of network switches 6 may communicate with network device 4 over a physical Ethernet interface supporting Ethernet protocols 14A-14B ("Ethernet protocols 14"). Network device 4 typically includes Broadband Remote Access Server (BRAS) functionality to aggregate output from switches 6 into a higher-speed uplink to network 10. Although data for subscriber devices 8 are transported from each of network switches 6 to network device 4 over the same physical connection, each of subscriber devices 8 may have a dedicated Ethernet port to communicate Ethernet frames to network device 4 and hence to network 10. In some embodiments, network device 4 may comprise a router that maintains routing information between subscriber devices 8 and network 10.

Virtual local area networks (VLANs) are a generic grouping mechanism for Ethernet packets that are independent of media access control (MAC) addressing. Exemplary Ethernet VLAN interfaces include one of a Fast Ethernet interface, a Gigabit Ethernet interface, a 10-Gigabit Ethernet interface or any other type of Ethernet network interface. VLANs enable each of network switches 6 to multiplex multiple protocol interfaces over a single physical Ethernet port. For example, network switch 6A may multiplex IP and PPPoE interfaces to one or more VLANs. Typically, an Ethernet frame header includes a VID that identifies the subscriber associated with the Ethernet packet; however, some customer networks may be unable to support or fail to include a VID within the Ethernet frame header.

As described below in more detail, in instances where the Ethernet header frame does not include a VID, the dynamic configuration techniques described herein allow network device 4 to dynamically build a primary VLAN sub-interface (PVS) and a subscriber VLAN sub-interface (SVS) over a VLAN major interface statically built over an Ethernet port of network device 4. Network device 4 may build the PVS based on Ethernet tagging information included within a plurality of protocol signaling packets. Network device 4 may build the SVS based on one or more subscriber information strings, i.e., ACIs, included within the plurality of protocol signaling packets. In general, a PVS refers to a VLAN sub-interface that network device 4 associates with one of network switches 6, and a SVS refers to a VLAN sub-interface that network device 4 associates with a particular one of subscriber devices 8. A VLAN major interface comprises a statically built interface capable of servicing multiple subscribers.

Network device 4 may identify one or more of subscriber devices 8 associated with received packets that may not include VIDs in order to dynamically build both the PVS and SVS for the identified ones of subscriber devices 8. In this way, despite receiving packets having no VIDs, network device 8 may continue to provide subscriber specific services to subscriber devices 8.

Figure 2:
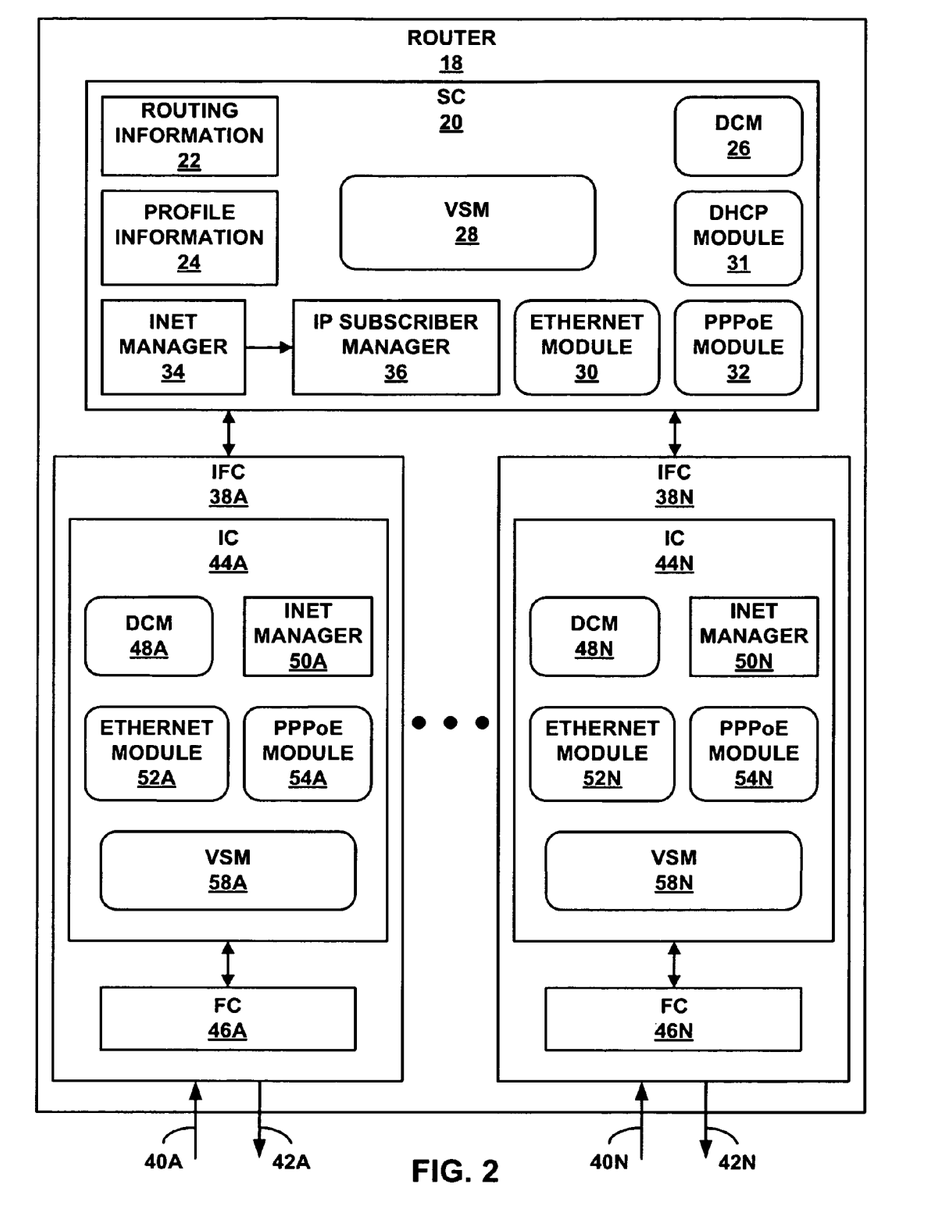
FIG. 2 is a block diagram illustrating an exemplary embodiment of a router.

FIG. 2 is a block diagram illustrating an exemplary embodiment of a router 18. Router 18 may operate substantially similar to network device 4 depicted in FIG. 1 in that router 18 is capable of dynamically configuring a VLAN interface despite receiving packets that do not include VIDs, consistent with the principles of the invention. Router 18 automatically determines a subscriber associated with a received Ethernet packet based on a subscriber information string, or ACI, included within the Ethernet frame header and dynamically builds both a PVS and a SVS over a statically configured VLAN major interface for the subscriber. After building the PVS and SVS, router 18 may dynamically build an interface stack over the SVS interface.

In the illustrated embodiment, router 18 includes a system controller (SC) 20 that maintains routing information 22 to reflect the current topology of a network, e.g., network 10 of FIG. 1, and other network entities to which router 18 is connected. SC 20 also maintains profile information 24 that may be applied to the static VLAN major interface. Profile information 24 may include commands that enable the dynamic building of PVSs and SVSs, as well as, protocol interface stacks over the VLAN major interface based on the subscriber information strings.

SC 20 includes a dynamic configuration manager (DCM) 26 responsible for servicing requests for the dynamic creation of PVSs and SVSs. SC 20 may further include a VLAN subscriber manager (VSM) 28 that maintains information used to determine whether a SVS exists to handle a specific subscriber information string. SC 20 further includes an Ethernet module 30, a DHCP module 31, a PPPoE module 32, an inet manager 34, and an IP subscriber manager 36.

Router 18 also includes interface cards (IFCs) 38A-38N ("IFCs 38") that receive packets on inbound links 40A-40N ("inbound links 40") and send packets on outbound links 42A-42N ("outbound links 42"). IFCs 38 are coupled to SC 20, typically via a high-speed switch (not shown). IFCs 38 include respective interface controllers (IC) 44A-44N ("ICs 44") and forwarding controllers (FC) 46A-46N ("FCs 46"). When FCs 46 receive protocol signaling packets from subscribers, e.g., subscriber devices 8 of FIG. 1, on inbound links 40 and a system administrator has configured router 18 to dynamically build VLAN interfaces based on subscriber information strings, FCs 46 exception the protocol signaling packets to ICs 44. Although illustrated as located within IFCs 38, ICs 46 and FCs 48 may be located in other components of router 18, such as SC 20.

ICs 44 respectively include DCMs 48A-48N ("DCMs 48"), inet managers 50A-50N ("inet managers 50"), Ethernet modules 52A-52N ("Ethernet modules 52"), PPPoE modules 54A-54N ("PPPoE modules 54"), and VSMs 58A-58N ("VSMs 58"). A system administrator statically builds a VLAN major interface over each Ethernet port included on FCs 46. The system administrator may also statically configure the VLAN major interface to allow the building and configuration of PVSs and SVSs, as well as interface stacks over the VLAN major interface. In some embodiments, the system administrator may statically configure the VLAN major interface by assigning a profile included within profile information 24 to the VLAN major interface. Typically, the profile includes commands that configure the VLAN major interface in this manner.

As illustrated in FIG. 2, both SC 20 and ICs 44 may include similar components, such as respective DCMs 28 and 48, VSMs 28 and 58, Ethernet modules 30 and 52, PPPoE modules 32 and 54, and Inet managers 34 and 50. Duplicate components result because of the way in which router 18 handles protocol signaling packets from varying protocols. For example, most DCHP signaling packets initiate transactions that SC 20 handles; however, PPPoE signaling packets initiate transactions that ICs 44 handle. Although these components reside separately within SC 20 and ICs 44, they perform substantially similar functions. DCMs 48 of ICs 44, for example, perform substantially the same function as described in reference to DCM 28 of SC 20. In instances where the components manage a set of synchronized data, such as VSMs 28, 58, one or more of these components may serve as a master and the others as servants to prevent race condition, i.e., conditions resulting in unsynchronized data. For purposes of illustration, it is assumed herein that VSM 28 maintains the master copy of the information used to determine whether an SVS exists for a specific subscriber information string, while VSMs 58 maintain copies of the master. However, the principles of the invention should not be limited to this configuration.

Initially, after a system administrator statically builds and assigns a profile to the VLAN major interface to enable dynamic creation of a PVS and SVSs, FC 46A, for example, may receive a packet. In accordance with the principles of the invention, FC 46A first determines whether the packet is a protocol signaling packet. If the packet is not a protocol signaling packet, FC 46A either forwards or drops the packet. However, if the packet is a protocol signaling packet, FC 46A determines whether an interface stack exists to handle the packet.

In the case where the protocol signaling packet comprises a DHCP discovery packet, FC 46A determines whether an IP interface over a PVS exists for the DHCP packet. If no IP interface exists, FC 46A exceptions the DHCP packet to Ethernet module 52A on IC 44A. If an IP interface does exists, FC 46A exceptions the DHCP packet directly to the IP interface, which then sends the packet to DHCP module 31 on SC 20. In the case where the protocol signaling packet comprises either a PPPoE PADI packet or a PPPoE PADR packet, FC 46A exceptions the PPPoE packet to Ethernet module 52A on IC 44A. If FC 46A receives packets that are not packet signaling packets, such as data packets or PPPoE Active Discover Termination (PADT) packets, FC 46A will drop the packets if a session is not yet established for the packets or will forward the packets directly to a PPPoE interface of an active session for the packets.

Assuming that the protocol signaling packet received by FC 46A conforms with DHCP and that an IP interface over a PVS for the packet does not exist, Ethernet module 52A receives the packet from FC 46A. Ethernet module 52A then determines from the Ethernet header encapsulating the protocol signaling packet whether a PVS exists within Ethernet module 52A to handle the tagging information included within the Ethernet header. If a PVS does not exist to handle the tagging information, Ethernet module 52A dynamically builds a PVS over the statically built VLAN major interface. Once the PVS is built, Ethernet module 52A issues a request to DCM 48A requesting that the application registered with DCM 48A for building IP interfaces build an IP interface over the newly built PVS. Generally, DCM 48A maintains a list or other data structure for identifying these registered applications. In the illustrated embodiment, inet manager 50A on IC 44A comprises the registered application responsible for creating IP interfaces. DCM 48A then sends the request to inet manager 50A to build the IP interface over the SVS for the packet.

Inet manager 50A may send the request to inet manager 34 within SC 20. In response to the request, inet manager 34 may cause communicate with IP subscriber manager 36 to receive authorization to dynamically create the requested IP interface within inet manager 50A based on information received from Inet manager 50A in IC 44A. Inet manager 34 of SC 20 may then send an authorization message concerning the new IP interface to inet manager 50A of IC 44A that authorizes inet manager 50A to dynamically build the IP interface within inet manager 50A over the PVS. IC 44A then drops the original DHCP signaling packet, thereby forcing a DCHP retry.

Upon receiving a retransmission of the original DHCP signaling packet, FC 46A once again determines whether an IP interface over a PVS for the packet exists and discovers that the newly built IP interface exists. FC 46A then exceptions the packet to the IP interface within inet manager 50A on IC 44A. Inet manager 50A sends the packet to DHCP module 31 on SC 20. If DHCP module 31 is configured to look for option-82 traffic, DHCP module 31 may discover a subscriber information string within an option-82 field included in the DHCP signaling packet. DHCP local and external servers within DHCP module 31 generate an event upon receiving any option-82 traffic. The event contains the subscriber information string of the DHCP packet.

DHCP module 31 of SC 20 sends the event to VSM 28 of SC 20. When VSM 28 receives the event, it determines whether the subscriber information string sent within the event corresponds to an existing SVS. VSM 28 maintains a mapping of subscriber information strings to SVSs within Ethernet modules 52 of ICs 44 and performs a lookup of this mapping using the subscriber information string as a key. The mapping may resemble a typical database, where VSM 28 maintains the master copy of this mapping, VSMs 58 of ICs 44 contain replicates of the master, and VSMs 28, 58 adhere to strict database rules to prevent database corruption.

If no SVS exists, VSM 28 adds a new entry to the mapping corresponding to the pair between the new SVS and the subscriber information string. VSM 28 issues a request to DCM 26 on SC 20 that the registered application responsible for creating SVSs create a new SVS to handle this particular subscriber information string. In the illustrated embodiment, Ethernet module 30 comprises the registered application for dynamically building SVSs. DCM 26 sends the request to Ethernet module 30, which in turn, sends the request to Ethernet module 52A. Ethernet module 52A then dynamically builds an SVS over the static VLAN major interface to handle the subscriber information string. Upon building the SVS, VSM 28 may receive a message indicating that the requested SVS was successfully built within Ethernet module 52A. In response to this message, VSM 28 may synchronize its mapping with those maintained by VSMs 58, thereby causing VSM 58A, for example, to update its mapping to reflect the addition of the SVS.

After building the SVS, Ethernet module 52A looks at up the higher-level protocol type for the DHCP packet and issues a request to DCM 48A requesting that the registered application responsible for dynamically building IP interface, i.e., inet manger 50A, dynamically build an IP interface over the newly built SVS. DCM 48A sends the request to inet manager 50A, which dynamically builds the IP interface over the SVS, in the manner described above. Once inet manager 50A builds this IP interface, router 18 may distinguish between subscriber devices residing within the same VLAN based on the subscriber information strings included in subsequent packets from the subscriber devices. In particular, FC 46A may receive a data packet and, based on a session ID of the data packet, determine that an IP interface exists over the SVS for data packets with this particular session ID and forward the data packet to the IP interface residing within inet manger 50A.

Assuming that the protocol signaling packet received by FC 46A conforms with PPPoE PADI or PADR, Ethernet module 52A receives the packet from FC 46A. Ethernet module 52A then determines from the Ethernet header encapsulating the protocol signaling packet whether a PVS exists within Ethernet module 52A to handle the tagging information included within the Ethernet header. If a PVS does not exist to handle the tagging information, Ethernet module 52A dynamically builds a PVS over the statically built VLAN major interface, as described above in the context of a DHCP signaling packet. However, unlike the processing of a DHCP signaling packet, Ethernet module 52A does not need to drop the PPPoE protocol signaling packet after building the PVS for the packet. Once the PVS for the packet exists, Ethernet module 52A sends the packet to VSM 58A of IC 44A. VSM 58A cracks the PPPoE signaling packet, such as a PPPoE PADI or PADR packet, to retrieve the subscriber information string stored within the DSL Forum Vendor specific tag of the PPPoE signaling packet. Using the subscriber information string as a key, VSM 58A accesses its maintained information, or replica mapping, to determine whether an SVS exists to handle this string.

If no SVS exists, VSM 58A issues a request to DCM 48A requesting that the registered application responsible for dynamically building SVSs, i.e., Ethernet module 52A, dynamically build an SVS interface to handle this particular subscriber information string. Upon receiving the request, Ethernet module 52A dynamically builds the SVS over the VLAN major interface within Ethernet module 52A. Ethernet module 52A may then issue a message to DCM 48A indicating that the SVS was successfully built. DCM 48A sends this message to VSM 58A. In response to this message, VSM 58A may synchronize its mapping with the mapping maintained by VSM 28 on SC 20, thereby causing VSMs 58 to update their mapping to reflect the addition of the SVS.

After building the SVS, Ethernet module 52A looks at up the higher-level protocol type for the PPPoE packet and, issues a request to DCM 48A of IC 44A requesting that the responsible registered application, i.e., PPPoE module 54A, dynamically build a PPPoE major interface over the SVS. DCM 48A sends the request to PPPoE module 54A, and PPPoE module 54A builds the PPPoE major interface over the SVS. PPPoE module 54A may respond to the request by sending a message to Ethernet module 52A indicating that the PPPoE major interface was successfully built.

Once the PPPoE major interface is built, FC 46A may receive a PPPoE Active Discover Session-Confirmation (PADS) packet and forward the PADS packet to Ethernet module 52A, which in turn sends the PADS packet to PPPoE module 54A to establish a PPPoE session. In response to the PADS packet, PPPoE module 54A dynamically builds the remaining PPPoE layers. During this session establishing procedure, PPPoE module 54A may build a PPPoE sub-interface over the PPPoE interface, over which it may build a PPP interface, and over which it may build an IP interface. In this manner, the invention techniques may enable a network device, such as router 18, to differentiate between packets conforming with both DHCP and PPPoE even though the packets may only include a single tagged VID or no VID.

After establishment of the PPPoE session for packets including a particular session ID, FC 46A forwards data packets with the session ID directly to the PPPoE interface stack and exceptions PPPoE PADT packets directly to PPPoE interface stack. On the other hand, FC 46A will continue to exception PPPoE PADI and PADR packets to Ethernet module 52A even after the session has been established.

Figure 3A:
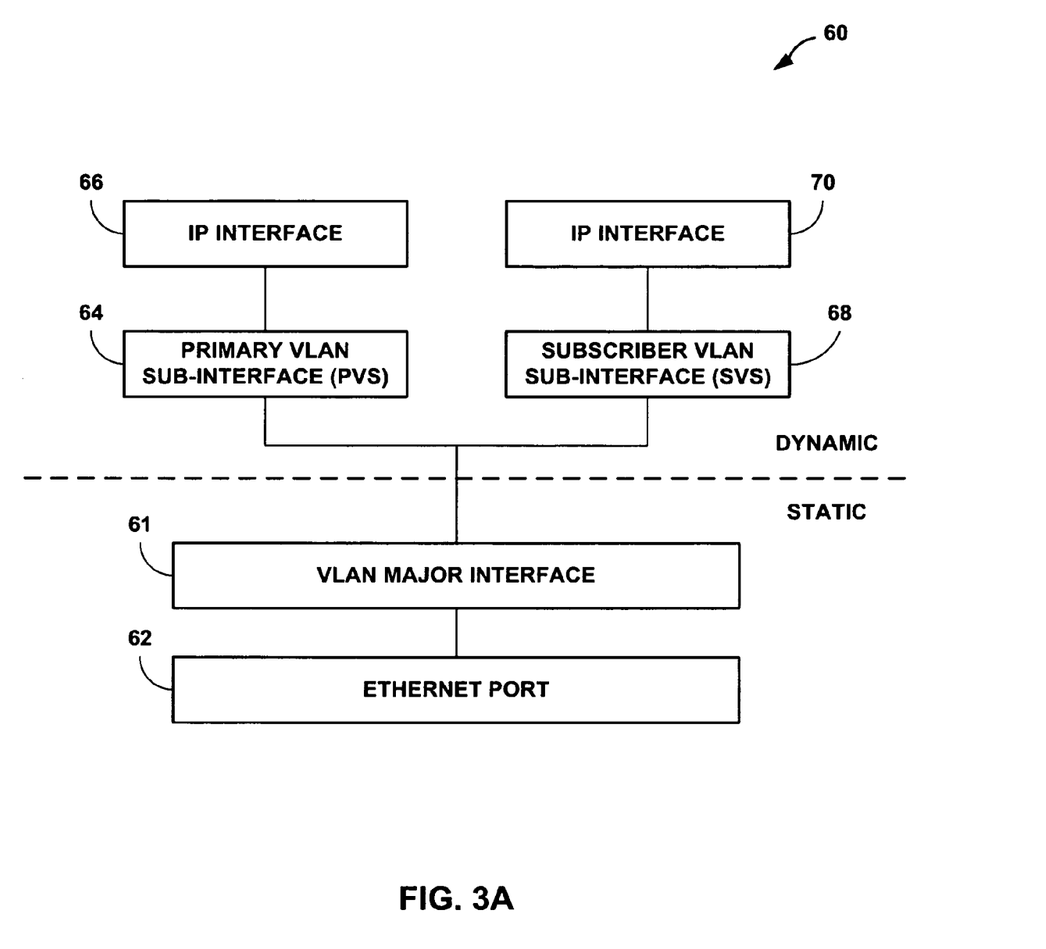
FIG. 3A is a block diagram illustrating an exemplary embodiment of DHCP dynamic interface stacks built over a static VLAN major interface.

FIG. 3A is a block diagram illustrating an exemplary embodiment of a DHCP dynamic interface stack 60 built over a static VLAN major interface 61, in accordance with an embodiment of the invention. Dynamic interface stack 60 includes an Ethernet port 62 and a VLAN major interface 61 statically created by a system administrator, as described above. For purposes of illustration, dynamic interface stack 60 is described in reference to actions performed by router 18 of FIG. 2; however, any network device capable of dynamically building VLAN interface stacks may implement these techniques and the principles of the invention should not be limited as such.

Dynamic interface stack 60 may not exist within any particular component of router 18 of FIG. 2 and may merely represent a logical stacking of interfaces within various components. For example, Ethernet module 52A may maintain VLAN major interface 61, PVS 64, and SVS 68; and inet manager 50A may maintain IP interfaces 66 and 70. FC 46A may be aware of this logical stacking via conventional techniques and exception packets to the managing component, as described above.

In the illustrated embodiment, Ethernet port 62 may comprise one of a Fast Ethernet interface, a Gigabit Ethernet interface, or a 10-Gigabit Ethernet interface or any other type of Ethernet network interface. VLAN major interface 61 may be statically configured to enable dynamic building and configuration of a PVS, such as PVS 64, and SVSs, such as SVS 68. The system administrator may enter commands at a command line or assign a profile to VLAN major interface 61 to enable the dynamic building and configuration of a PVS and SVSs. In addition, the profile may comprise attributes that specify a type of interface column to be dynamically built over the VLAN minor interface.

As described above, one of FCs 46 of router 18 (e.g., FC 46A) receives a first Ethernet packet on an Ethernet port, such as Ethernet port 62, over which VLAN major interface 61 is statically built. FC 46A determines whether the packet comprises a protocol signaling packet and, if so, next determines whether an IP interface over a PVS for the packet exists. If no IP interface exists, FC 46A exceptions the DHCP signaling packet to Ethernet module 52A within IC 44A. Ethernet module 52A first determines the protocol to which the protocol signaling packet corresponds. In the illustrated embodiment, Ethernet module 52A receives and detects a DHCP signaling packet, such as a DHCP discovery packet. In other embodiments, Ethernet module 52A may receive and detect a PPPoE signaling packet, such as a PADI signaling packet or a PADR signaling packet.

Ethernet module 52A of IC 44A analyzes the Ethernet header tagging information included in the received packet. In cases where the Ethernet header tagging information does not correspond to an existing PVS, Ethernet module 52A performs the functions described above to dynamically build PVS 64 over VLAN major interface 61. After creating PVS 64, Ethernet module 52A requests inet manager 50A to build IP interface 66 over PVS 64 via DCM 48A, as described above.

Next, IC 44A drops the DHCP signaling packet forcing a DHCP retry, which in turn results in FC 46A receiving another DHCP signaling packet identical to the first protocol signaling packet. FC 46A again determines whether an IP interface over a PVS for the packet exists. Upon determining that the newly created IP interface over the PVS for the packet exists, FC 46A exceptions the packet up to the IP interface within inet manager 50A. Inet manger 50A then sends the packet to DHCP module 31 of SC 20. DHCP module 31 sends an event to VSM 28 containing the subscriber information string, which DHCP module 31 retrieves from the DHCP signaling packet. VSM 28 performs a lookup of its mapping using the subscriber information string as a key.

Upon determining that no SVS exists to handle the subscriber information string, VSM 28 performs the actions described above to request Ethernet module 52A to build SVS 68 over VLAN major interface 61 via DCM 26 and Ethernet module 30 of SC 20. During these actions, VSM 28 updates its mapping, as do VSMs 58 of ICs 44, to maintain accurate and synchronized mapping information. Once SVS 68 is built, Ethernet module 52A requests via DCM 48A that inet manager 50A dynamically build IP interface 70 over SVS 68, as described above. In this way, router 18 dynamically builds the interface stack necessary to handle IP traffic associated with the subscriber information string included in the received packet. By dynamically creating SVS 68 and the above lying IP interface 70, router 18 may distinguish between packets arriving from the subscriber having the subscriber information string associated with SVS 68 and other packets from other subscribers.

Figure 3B:
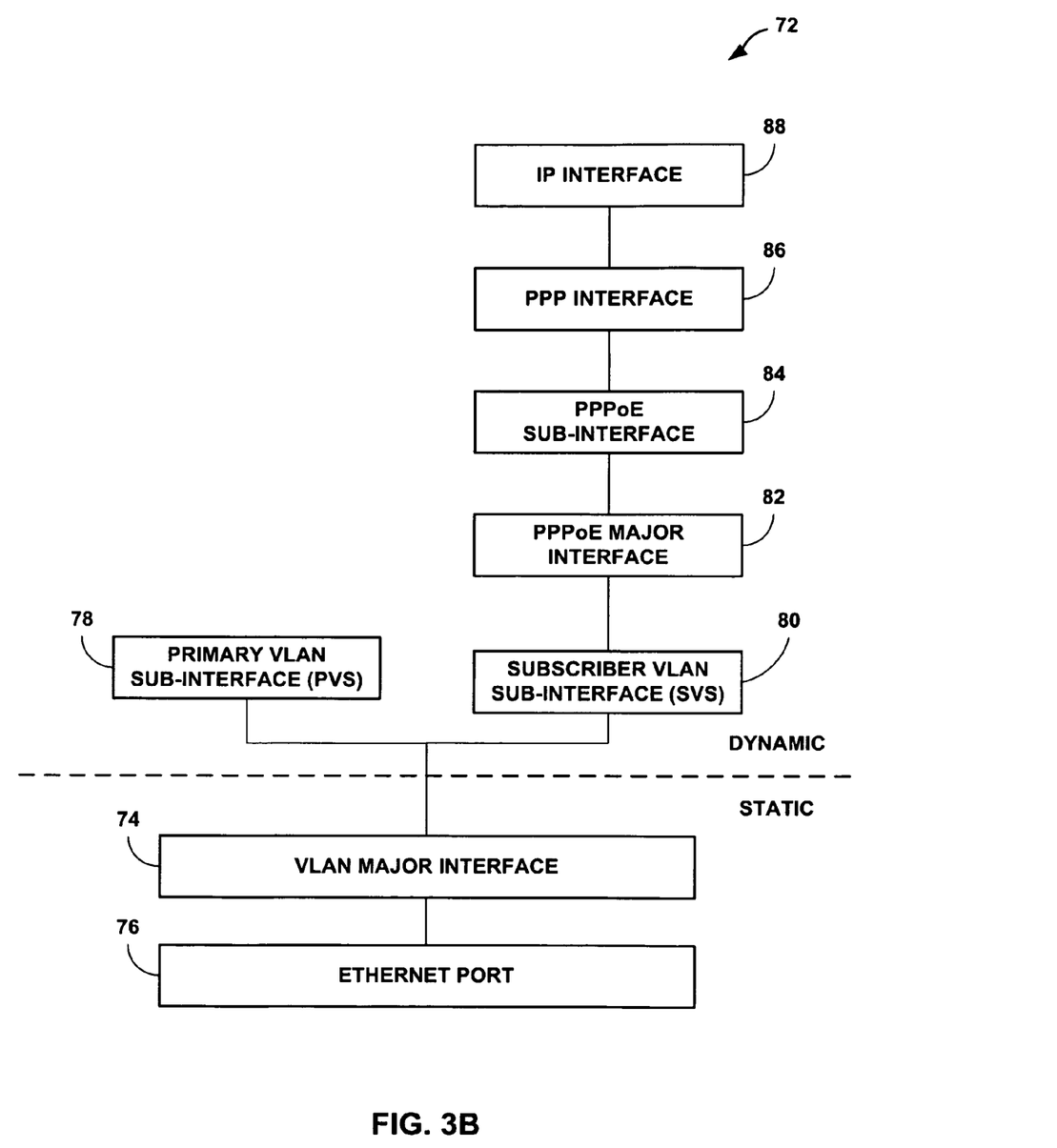
FIG. 3B is a block diagram illustrating an exemplary embodiment of PPPoE dynamic interface stacks built over a static VLAN major interface.

FIG. 3B is a block diagram illustrating an exemplary embodiment of a PPPoE dynamic interface stack 72 built over a static VLAN major interface 74, in accordance with an embodiment of the invention. Dynamic interface stack 72 includes an Ethernet port 76 and a VLAN major interface 74 statically created by a system administrator, as described above. For purposes of illustration, dynamic interface stack 72 is described in reference to actions performed by router 18 of FIG. 2; however, any network device capable of dynamically building VLAN interface stacks may implement these techniques and the principles of the invention should not be limited as such.

Dynamic interface stack 72 may not exist within any particular component of router 18 of FIG. 2 and may merely represent a logical stacking of interfaces within various components. For example, Ethernet module 52A may maintain VLAN major interface 74, PVS 78, and SVS 90; and PPPoE module 54A may maintain PPPoE major interface 82, PPPoE sub-interface 84, PPP interface 86, and IP interface 88. FC 46A may be aware of this logical stacking via conventional techniques and exception packets to the managing component described above.

In this example, Ethernet port 76 may comprise one of a Fast Ethernet interface, a Gigabit Ethernet interface, or a 10-Gigabit Ethernet interface or any other type of Ethernet network interface. VLAN major interface 74 may be statically configured to enable dynamic building and configuration of a PVS, such as PVS 78, and SVSs, such as SVS 80. The system administrator may enter commands at a command line or assign a profile to VLAN major interface 74 to enable this dynamic building and configuration of a PVS and SVSs. In addition, the profile may comprise attributes that specify a type of interface stack to be dynamically built over the VLAN minor interface.

As described above, one of FCs 46 of router 18 (e.g., FC 46A) receives a first Ethernet packet on an Ethernet port, such as Ethernet port 76, over which VLAN major interface 74 is statically built. FC 46A determines whether the packet comprises a protocol signaling packet, such as a PPPoE PADI or PADR packet, and, if so, exceptions the protocol signaling packet to Ethernet module 52A within IC 44A. Ethernet module 52A first determines the protocol to which the protocol signaling packet corresponds. In the illustrated embodiment, Ethernet module 52A receives and detects a PPPoE protocol signaling packet. As described above, in other embodiments, Ethernet module 52A may receive and detect a DHCP signaling packet, such as a DHCP discovery packet.

Ethernet module 52A analyzes the Ethernet header tagging information included in the received packet. In cases where the Ethernet header tagging information does not correspond to an existing PVS, Ethernet module 52A performs the functions described above to dynamically build PVS 78 over VLAN major interface 74. However, contrary to the DHCP context, an IP interface does not need to be built over PVS 78 in the PPPoE context.

Ethernet module 52A then communicates the subscriber information string stored within the PPPoE signaling packet to VSM 58A. Using the subscriber information string as a key, VSM 58A accesses its maintained information, or replica mapping, to determine whether an SVS exists to handle this string. If no SVS exists, VSM 58A issues a request to DCM 48A that the registered application, i.e., Ethernet module 52A, build an SVS 80 over VLAN major interface 74, as describe above. Ethernet module 52A builds corresponding SVS 80 in response to the request. Ethernet module 52A may then issue a message to DCM 48A indicating that SVS 80 was successfully built. DCM 48A sends this message to VSM 58A.

After building SVS 80, Ethernet module 52A requests via DCM 48A that PPPoE module 54A dynamically build a PPPoE major interface 82 over SVS 80, as described above. PPPoE module 54A may respond to the request by sending a message to Ethernet module 52A indicating that PPPoE major interface 82 was successfully built. Once PPPoE major interface 82 is built, FC 46A may receive a PPPoE PADS packet and forward the PADS packet to Ethernet module 52A, which in turn sends the PADS packet to PPPoE module 54A to establish a PPPoE session. In response to the PADS packet, PPPoE module 54A dynamically builds a PPPoE sub-interface 84 over PPPoE major interface 82, over which it may build a PPP interface 86, and over which it may build an IP interface 88. In this way, router 18 dynamically builds the interface stack necessary to handle IP traffic associated with the subscriber information string included in the received packet.

After the PPPoE interface stack is built for packets including a particular session ID, FC 46A forwards data packets with the session ID directly to IP interface 82 and exceptions PPPoE PADT packets directly to PPPoE major interface 82. On the other hand, FC 46A will continue to exception PPPoE PADI and PADR packets to Ethernet module 52A even after the session has been established.

Although both FIGS. 3A and 3B illustrate dynamic interface stacks 60, 72 having only one SVS 68, 80, both of dynamic interface stacks 60 and 72 may include multiple SVSs substantially similar to SVSs 68 and 80. The principles of the invention should not be limited to single SVS dynamic interface stacks, and in some embodiments, many thousand SVSs may exist within a single dynamic interface stack.

Figure 4A:
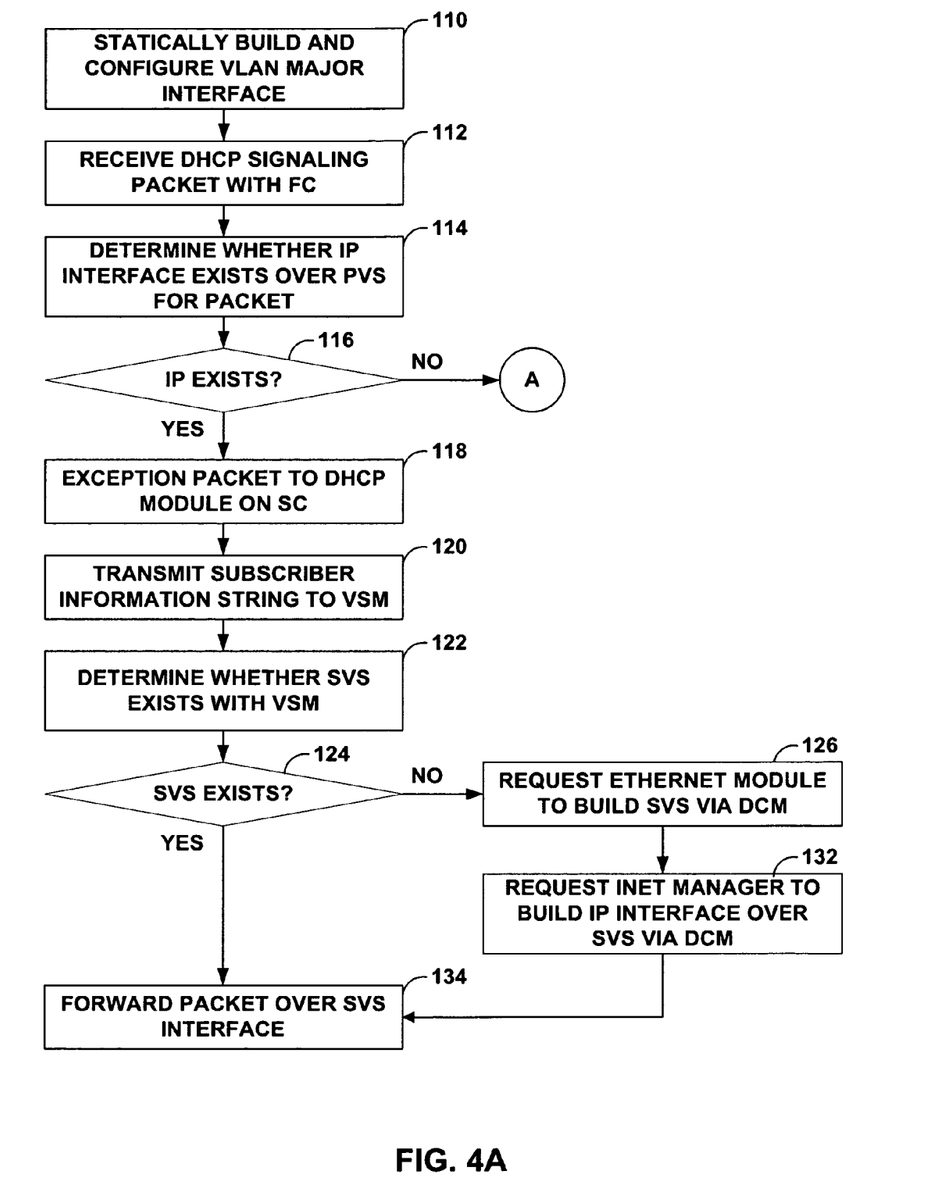
FIGS. 4A and 4B are flowcharts illustrating an exemplary operation of a network device dynamically building a VLAN interface based on a subscriber information string included within a DHCP signaling packet.
Figure 4B:
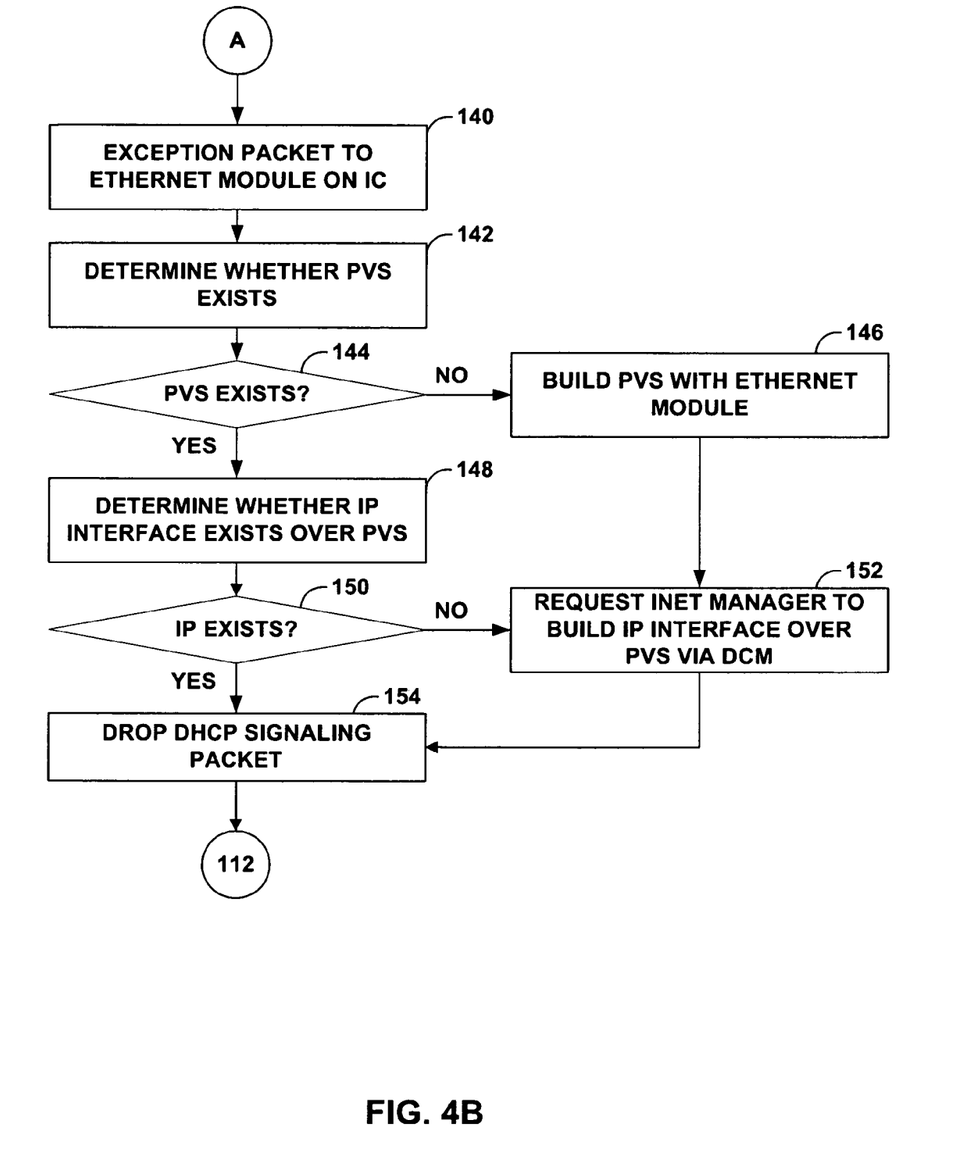

FIGS. 4A and 4B are flowcharts illustrating an exemplary operation of a network device dynamically building a VLAN interface based on a subscriber information string included within a DHCP signaling packet. The operation is described in reference to router 18 of FIG. 2; however, the principles of the invention may be applied to any network device including switches, hubs, servers, and gateways.

As shown in FIG. 4A, a system administrator initially builds and configures a static VLAN major interface, such as VLAN major interfaces 61 and 74, respectively, of FIGS. 3A and 3B (110). For example, the system administrator may statically build a VLAN major interface within IC 44A and configure the VLAN major interface via a profile of profile information 22 to enable dynamic building of a PVS and SVSs over the VLAN major interface. After the administrator configures the VLAN major interface, router 18 may receive packets from subscriber devices, such as subscriber devices 8 of FIG. 1, that do not include VID information or only include a single tagged VID. In the illustrated embodiment, router 18 receives a DHCP signaling packet, such as a DHCP discover packet, that includes no VID information via inbound link 40A (112). FC 46A, for example, then determines whether an IP interface exists over a SVS for the DHCP signaling packet (114).

As shown in FIG. 4B, if no IP interface exists (no branch of 116), FC 46A exceptions the packet to Ethernet module 52A on IC 44A (140). Upon receiving the packet, Ethernet module 52A of IC 44A determines whether a PVS exists to handle the DHCP signaling packet (142). If no PVS exists (no branch of 144), Ethernet module 52A builds a PVS over the VLAN major interface in the manner described above (146). If the PVS does exist within Ethernet module 52A (yes branch of 144), Ethernet module 52A determines whether an IP interface over the PVS exists (148).

After dynamically building the PVS or if an IP interface does not exist over an existing PVS, Ethernet module 52A requests inet manager 50A to build an IP interface over the PVS interface via DCM 48A to facilitate DHCP packets (152). Because the IP interface needs to be built prior to receiving the DHCP signaling packet, Ethernet module 52A drops the DHCP signaling packet (154), thereby causing a DHCP retry event.

Returning to FIG. 4A, the DHCP retry event results in FC 46A receiving an identical DHCP signaling protocol to the previous DHCP signaling protocol (112), whereupon FC 46A again determines whether an IP interface exists over a PVS for the DHCP signaling packet (114). Upon finding the newly created IP interface (yes branch of 116), FC 46A exceptions the packet to the IP interface within inet manager 50A, which in turn sends the packet to DHCP module 31 of SC 20 (118). In some embodiments, a system administrator may pre-configure DHCP module 31 to generate an event upon receiving option-82 traffic that includes a subscriber information string. DHCP module 31 sends this event to VSM 28 that includes the subscriber information string included within the DHCP signaling packet (120). Based on this subscriber information string, VSM 28 determines whether a SVS exists to handle the packet (122).

If an SVS does not exist (no branch of 124), VSM 28 requests via DCM 26 of SC 20 that Ethernet module 30 of SC 20 build a SVS, thereby causing Ethernet module 30 to build the SVS over the VLAN major interface (126). After building the SVS, Ethernet module 30 requests inet manager 34 of SC 20 via DCM 26 to build an IP interface over the SVS interface, thereby completing the DHCP subscriber specific interface stack (132). After the SVS for the subscriber information string is built or if the SVS already exists, FC 46A may forward the packet over the SVS interface to which the packet corresponds (134). In this way, router 18 may dynamically build VLAN interface without relying upon VID information.

Figure 5:
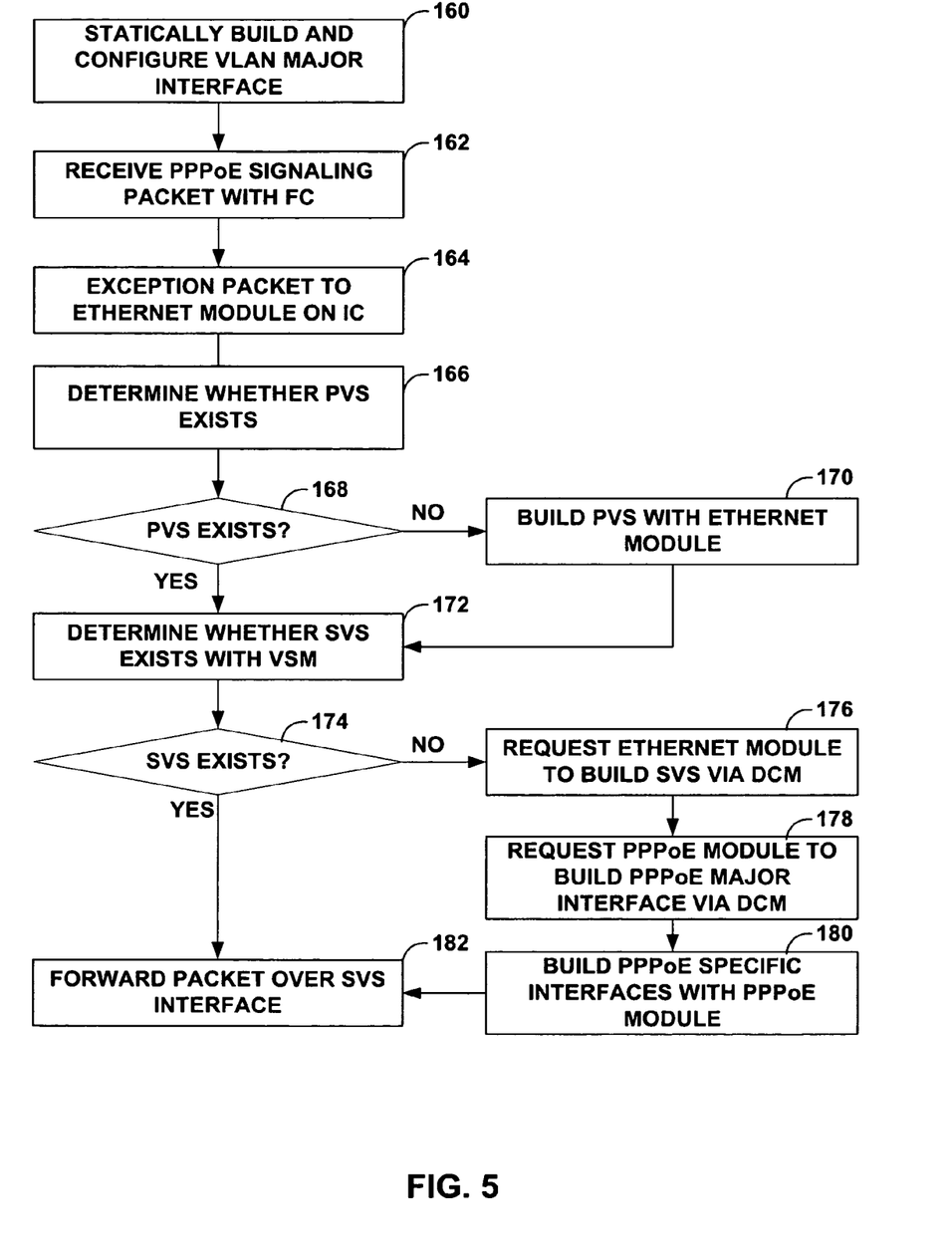
FIG. 5 is a flowchart illustrating an exemplary operation of a network device dynamically building a VLAN interface based on a subscriber information string included within a PPPoE signaling packet.

FIG. 5 is a flowchart illustrating an exemplary operation of a network device dynamically building a VLAN interface based on a subscriber information string included within a PPPoE signaling packet. The operation is described in reference to router 18 of FIG. 2; however, the principles of the invention may be applied to any network device including switches, hubs, servers, and gateways.

Initially, a system administrator builds and configures a static VLAN major interface, as described above (160). After the administrator configures the VLAN major interface, router 18 may receive packets from subscriber devices, such as subscriber devices 8 of FIG. 1, that do not include VID information or only include a single tagged VID. In the illustrated embodiment, router 18 receives a PPPoE signaling packet, such as a PADI or PADR packet, that includes no VID information via inbound link 40A (162). FC 46A, for example, then exceptions the PPPoE signaling packet to Ethernet module 52A of IC 44A (162).

Ethernet module 52A of IC 44A receives the packet and determines whether a PVS exists to handle the PPPoE signaling packet (166). If a PVS does not exist (no branch of 168), Ethernet module 52A builds a PVS over the VLAN major interface in the manner described above (170). Unlike DHCP signaling packets, PPPoE signaling packets do not require an IP interface to be built over the PVS. Once the PVS is built or if the PVS already exists, Ethernet module 52A communicates the subscriber information string stored within the PPPoE signaling packet to VSM 58A. Using the subscriber information string as a key, VSM 58A accesses its maintained information, or replica mapping, to determine whether an SVS exists to handle this string (172). If a SVS does not exist (no branch 174), VSM 58A requests Ethernet module 52A via DCM 48A to build a SVS (176).

After building the SVS, Ethernet module 52A requests via DCM 48A that PPPoE module 54A dynamically build a PPPoE major interface over the SVS (178). Once the PPPoE major interface is built, FC 46A may receive a PPPoE PADS packet and forward the PADS packet to Ethernet module 52A, which in turn sends the PADS packet to PPPoE module 54A to establish a PPPoE session. In response to the PADS packet, PPPoE module 54A dynamically builds PPPoE specific interfaces over the PPPoE major interface (180). For example, PPPoE module 54A may dynamically build a PPPoE sub-interface over the PPPoE major interface, over which it may build a PPP interface, and over which is may build an IP interface. Once the interfaces are created or if the SVS already exists, FC 46A may forward the packet over the SVS and its overlying interfaces (182). For example, FC 46A forwards data packets with a particular session ID directly to the PPPoE interface stack and exceptions PPPoE PADT packets directly to the PPPoE interface stack. On the other hand, FC 46A will continue to exception PPPoE PADI and PADR packets to Ethernet module 52A even after the session has been established.

In this manner, a network device, such as router 18, acting in accordance with the principles of the invention may dynamically build a VLAN interface based on a subscriber information string included within a protocol signaling packet. While described in reference to protocol signaling packets, other packet types of varying other protocols may contain subscriber information strings by which a network device may dynamically build a VLAN interface, and the invention should not be limited as such. By applying the principles of the invention to routers that include BRAS functionality, the router may distinguish between subscriber devices, thereby allowing the BRAS application to provide subscriber specific services despite the lack of VID information. Various embodiments of the invention have been described. These and other embodiments are within the scope of the following claims.

The invention claimed is:

1. A method comprising:

receiving a packet on an Ethernet port of a network device, wherein the packet includes Ethernet tagging information and a subscriber information string;

dynamically building within the network device a primary virtual local area network (VLAN) sub-interface (PVS) based on the Ethernet tagging information;

dynamically building within the network device a subscriber VLAN sub-interface (SVS) based on the subscriber information string;

determining that the packet conforms with the Dynamic Host Configuration Protocol (DHCP);

dynamically building a first Internet Protocol (IP) interface over the PVS within the network device based on the determination that the packet conforms with the DHCP; and dynamically building a second IP interface over the SVS within the network device based on the determination that the packet conforms with the DHCP.

2. The method of claim 1, wherein receiving a packet comprises receiving a protocol signaling packet.

3. The method of claim 2, wherein receiving a protocol signaling packet comprises receiving a Dynamic Host Configuration Protocol (DHCP) discovery packet.

4. A method comprising:
receiving a packet on an Ethernet port of a network device, wherein the packet includes Ethernet tagging information and a subscriber information string;
dynamically building within the network device a primary virtual local area network (VLAN) sub-interface (PVS) based on the Ethernet tagging information;
dynamically building within the network device a subscriber VLAN sub-interface (SVS) based on the subscriber information string;
determining that the packet conforms with the Point-to-Point Protocol over Ethernet (PPPoE); and
dynamically building a PPPoE major interface over the SVS within the network device based on the determination that the packet conforms with the PPPoE.

5. The method of claim 1, further comprising statically building a VLAN major interface over the Ethernet port on the network device, wherein dynamically building the PVS and the SVS comprises dynamically building the PVS and the SVS over the VLAN major interface based on the respective Ethernet tagging information and subscriber information string.

6. The method of claim 5, further comprising configuring the VLAN major interface by assigning a profile to the VLAN major interface that enables the dynamic building of the PVS and the SVS.

7. The method of claim 1, wherein dynamically building within the network device the SVS comprises:
retrieving the subscriber information string from the packet;
determining from a mapping maintained by the network device whether the SVS exists based on the subscriber information string; and
dynamically building within the network device the SVS upon a determination that the SVS does not exist within the mapping to handle the subscriber information string.

8. The method of claim 7, further comprising forwarding the packet over the SVS upon a determination that the SVS does exist within the mapping to handle the subscriber information string.

9. The method of claim 1, wherein dynamically building the second IP interface over the SVS comprises dynamically building within the network device the second IP interface over the SVS based on a profile assigned to the VLAN major interface.

10. A network device comprising:
an interface element that includes an interface controller and an Ethernet port;
a forwarding controller configured to receive a packet from the Ethernet port and forwards the received packet to the interface controller, wherein the packet includes Ethernet tagging information and a subscriber information string;
an Ethernet module in the interface controller configured to dynamically builds within the network device a primary virtual local area network (VLAN) sub-interface (PVS) based on the Ethernet tagging information and a subscriber VLAN sub-interface (SVS) based on the subscriber information string;
a Dynamic Configuration Manager (DCM); and
an Inet manager registered for building interface layers of interface stacks,
wherein the Ethernet module is configured to determine that the packet conforms with the Dynamic Host Configuration Protocol (DHCP),
wherein the Ethernet module is configured to, via the DCM, request the met manager to dynamically build a first Internet Protocol (IP) interface over the PVS based on the determination that the packet conforms with the DHCP, and
wherein the Ethernet module is configured to, via the DCM, request the met manager to dynamically build a second IP interface over the SVS based on the determination that the packet conforms with the DHCP.

11. The network device of claim 10, wherein the packet comprises a protocol signaling packet.

12. The network device of claim 11, wherein the protocol signaling packet comprises a Dynamic Host Configuration Protocol (DHCP) discovery packet.

13. A network device comprising:
an interface clement that includes an interface controller and an Ethernet port;
a forwarding controller configured to receive a packet from the Ethernet port and forward the received racket to the interface controller, wherein the packet includes Ethernet tagging information and a subscriber information string;
an Ethernet module in the interface controller configured to dynamically build within the network device a primary virtual local area network (VLAN) sub-interface (PVS) based on the Ethernet tagging information and a subscriber VLAN sub-interface (SVS) based on the subscriber information string; and
a Dynamic Configuration Manager (DCM),
wherein the Ethernet module is configured to determines that the packet conforms with the Point-to-Point Protocol over Ethernet (PPPoE) and, via the DCM, requests a PPPoE module to dynamically build a PPPoE major interface based on the determination that the packet conforms with the PPPoE; and
wherein the PPPoE module is configured to dynamically builds a PPPoE sub-interface, a PPP interface, and an Internet Protocol (IP) interface to establish a PPPoE session.

14. The network device of claim 10,
wherein the network device is configured to receive commands from a system administrator that configure the network device to statically builds a VLAN major interface over the Ethernet port on the network device, and
wherein the Ethernet module is configured to dynamically builds the PVS and the SVS over the VLAN major interface based on the respective Ethernet tagging information and the subscriber information string.

15. The network device of claim 14, wherein the network device is configured to receive commands from the system administrator that configures the VLAN major interface by assigning a profile to the VLAN major interface that enables the dynamic building of the PVS and the SVS over the VLAN major interface.

16. The network device of claim 10, further comprising a VLAN subscriber manager (VSM) that:
maintains a mapping between subscriber information strings and SVSs;
retrieves the subscriber information string from the packet;

using the subscriber information string as a key, determines from the mapping whether the SVS exists to handle the subscriber information string; and via the DCM, requests the Ethernet module to dynamically build within the network device the SVS upon a determination that the SVS does not exist within the mapping to handle the subscriber information string.

17. The network device of claim 16, wherein the forwarding controller forwards the packet over the SVS upon a determination that the SVS does exist within the mapping to handle the subscriber information string.

18. The network device of claim 10, wherein the Inet manager dynamically builds the second IP interface over the SVS based on a profile assigned to the VLAN major interface.

19. The method of claim 4, wherein receiving a packet comprises receiving one of a Point-to-Point Protocol over Ethernet (PPPoE) PADI packet, and a PPPoE PADR packet.

20. The network device of claim 13, wherein the packet comprises one of a Point-to-Point Protocol over Ethernet (PPPoE) PADI packet, and a PPPoE PADR packet.

* * * * *

UNITED STATES PATENT AND TRADEMARK OFFICE
CERTIFICATE OF CORRECTION

PATENT NO. : 7,492,766 B2  Page 1 of 1
APPLICATION NO. : 11/402145
DATED : February 17, 2009
INVENTOR(S) : Cabeca et al.

It is certified that error appears in the above-identified patent and that said Letters Patent is hereby corrected as shown below:

IN THE CLAIMS:

Column 16, line 8 (Claim 10), "the met manager" should read -- the Inet manager --

Column 16, line 13 (Claim 10), "the met manager" should read -- the Inet manager --

Column 16, line 26 (Claim 13), "racket" should read -- packet --

Signed and Sealed this

Ninth Day of November, 2010

David J. Kappos
*Director of the United States Patent and Trademark Office*